United States Patent
Cotton

(10) Patent No.: US 7,393,497 B1
(45) Date of Patent: Jul. 1, 2008

(54) SYSTEM AND FILTER FOR FILTERING HARD ALPHA INCLUSIONS FROM REACTIVE METAL ALLOYS

(75) Inventor: James D. Cotton, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/793,558

(22) Filed: Mar. 4, 2004

Related U.S. Application Data

(63) Continuation of application No. 10/097,478, filed on Mar. 14, 2002, now abandoned.

(51) Int. Cl.
*B23K 1/00* (2006.01)
(52) U.S. Cl. ............... 266/230; 266/45; 266/227
(58) Field of Classification Search ........ 266/202, 266/205, 227, 229, 230, 45
See application file for complete search history.

(56) References Cited

U.S. PATENT DOCUMENTS

| | | | | |
|---|---|---|---|---|
| 3,127,668 A | * | 4/1964 | Troy | 428/605 |
| 3,526,584 A | * | 9/1970 | Shaw | 204/192.22 |
| 3,681,063 A | * | 8/1972 | Douglass | 419/27 |
| 4,406,683 A | * | 9/1983 | Demarest, Jr. | 65/134.9 |
| 4,834,876 A | * | 5/1989 | Walker | 210/185 |
| 4,999,101 A | * | 3/1991 | Tadayon | 266/227 |
| 5,139,238 A | * | 8/1992 | Buhr | 266/238 |
| 5,213,612 A | * | 5/1993 | Minnear et al. | 75/415 |
| 6,235,381 B1 | | 5/2001 | Sanders et al. | |
| 6,320,375 B1 | | 11/2001 | Cotton et al. | |
| 6,401,537 B1 | | 6/2002 | Gigliotti, Jr. et al. | |
| 2001/0004050 A1 | * | 6/2001 | Byron et al. | 204/279 |
| 2003/0150294 A1 | | 8/2003 | Stefansson et al. | |

FOREIGN PATENT DOCUMENTS

WO    WO 01/71337 A1    9/2001

OTHER PUBLICATIONS

James D. Cotton, Larry P. Clark, Theodore R. Reinhart, W. Steven Spear, Stewart J. Veeck, George R. Strabel; *Inclusions in TI-6AL-4V Investment Castings*; pp. 1-9; American Institute of Aeronautics and Astronautics; AIAA-2000-1464, Dec. 2000.

\* cited by examiner

*Primary Examiner*—Scott Kastler
(74) *Attorney, Agent, or Firm*—Alston & Bird LLP

(57) ABSTRACT

A system for filtering hard alpha inclusions from a reactive metal alloy, such as titanium, is provided. The system includes a vessel, a receptacle and a filter. The vessel is capable of holding the reactive metal alloy in a molten form, and can pour the molten reactive metal alloy. The receptacle is for receiving the molten reactive metal alloy poured from the vessel. And to prevent at least some hard alpha inclusions from entering the receptacle, the filter is disposed between the vessel and the receptacle such that the molten reactive metal alloy passes therethrough before being received by the receptacle. The filter includes a frame, and a porous surface that is disposed within the frame. The porous surface defines openings that are sized to permit the reactive metal alloy in molten form to pass therethrough while capturing hard alpha inclusions.

15 Claims, 4 Drawing Sheets

SYSTEM AND FILTER FOR FILTERING HARD ALPHA INCLUSIONS FROM REACTIVE METAL ALLOYS

CROSS-REFERENCE TO RELATED APPLICATIONS

This application is a continuation of U.S. application Ser. No. 10/097,478, filed Mar. 14, 2002, now abandoned which is hereby incorporated herein in its entirety by reference.

FEDERALLY SPONSORED RESEARCH OR DEVELOPMENT

This invention was made with government support under Contract No. F33657-97-C-0030 awarded by Department of the Air Force. The government may have certain rights in this invention.

FIELD OF THE INVENTION

The present invention relates generally to manufacturing components from reactive metal alloys and, more particularly, to filtering hard alpha inclusions from reactive metal alloys during casting of components from the same.

BACKGROUND OF THE INVENTION

In many industries today, such as the biomedical and aerospace industries, components experience severe service conditions and, thus, are often made from titanium alloys or superalloys. For example, turbine-powered aircraft contain critical rotating components in the engine, such as the fan, compressor and the turbine sections, that are made from titanium alloys and/or superalloys. Generally, such alloys are manufactured by secondary remelting processes, such as plasma arc cold hearth melting (PAM), electron beam cold hearth melting (EBM), vacuum arc remelting (VAR), and electroslag remelting (ESR). During the manufacturing of the components, quality control takes a significant role because failure of such components can lead to catastrophic loss of the complex system as well as other losses.

In quality control, one of the most important quality issues for titanium alloys and superalloys is melt-related inclusions. In this regard, inclusions can consist of unusually coarse segregated phases formed in the melt, or as exogenous materials having origins outside the deliberate alloy constituents. In the case of exogenous materials for investment castings, one type of inclusion is mold shell fragments. Mold shell fragments are inadvertently released from the ceramic shell mold during casting as a result of high thermal stresses and erosion of the mold by the molten metal. The ceramic mold innermost layer (that faces the molten metal) typically contains rare earth metal oxide(s), such as erbia, that are utilized because of their high melting point and chemical compatibility with the reactive titanium melt. Upon release, the mold shell fragments may be incorporated into the body of the casting itself, and thereby become inclusion defects.

Another type of exogenous inclusion, peculiar to titanium and other reactive metal alloys with solvus temperatures that rise with interstitial oxygen, nitrogen or carbon content, is "hard alpha", also known as Type I inclusions. Hard alpha inclusions originate within such alloys during process operations, such as welding, flame cutting, grinding, cutting and even furnace air leaks, that expose the molten alloy to elements in air, particularly oxygen, nitrogen, and carbon. When such exposure occurs, the alloy takes the elements into solution where the elements simultaneously stabilize and embrittle the alpha phase of the alloy. By stabilizing and embrittling the alpha phase, a defect is created within the alloy that is very similar in most other respects to the base alloy. Particulate debris from such operations can inadvertently migrate to the casting furnace and enter the ceramic shell mold as the casting pour takes place. Because hard alpha inclusions have a melting point exceeding that of the clean alloy, hard alpha inclusions can survive exposure to the melt, enter the mold and become a brittle inclusion. Additionally, hard alpha inclusions can enter the primary metal supply stream and unknowingly become part of the melt stock.

As stated, hard alpha inclusions originate during certain process operations within titanium and other reactive metal alloys with solvus temperatures displaying a positive slope as oxygen, nitrogen or carbon are added. Such process operations are integral to other process streams at the foundry where the components are manufactured and, as such, the process operations cannot be totally eliminated or isolated from the casting activity. As a result, detailed contamination control plans are typically implemented to prevent the generation and introduction of hard alpha debris into the foundry. Such contamination control plans, however, have a number of drawbacks. While contamination control plans aid in preventing the generation and introduction of hard alpha debris, such control plans generally do not remove hard alpha debris that actually do form or become introduced from operations external to the foundry. Also, contamination control plans typically add cost to the manufacture of the components, and add time required in the production schedule of the components. Additionally, such contamination control plans are generally difficult to enforce among manufacturers, and cannot be easily validated. In this regard, because of the limitations of contamination control plans and the associated risk of component failure, the design of components made from such alloys still typically accounts for the presence of hard alpha inclusions.

SUMMARY OF THE INVENTION

In light of the foregoing background, the present invention provides a system and filter for filtering hard alpha inclusions from reactive metal alloys. In contrast to conventional contamination control plans, the system and filter of the present invention remove hard alpha debris that forms or becomes introduced into the foundry. As such, the design of components made from relevant alloys manufactured according to the present invention need not account for the presence of hard alpha inclusions. Also, the system and filter add relatively little cost to the manufacture of components, when compared to the cost to develop and implement a conventional detailed contamination control plan. Utilizing the system and filter of the present invention does not add any appreciable time to the production schedule of components. Further, because the system and filter of the present invention remove hard alpha inclusions as opposed to attempting to control or limit the formation of such contaminants, no need exists to enforce or validate implementation of the filter as required by conventional contamination control plans.

According to one embodiment, the present invention provides a system for filtering hard alpha inclusions from a reactive metal alloy, such as titanium. The system includes a vessel that is capable of holding the reactive metal alloy in a molten form, and can pour the molten reactive metal alloy. The system also includes a receptacle for receiving the molten reactive metal alloy poured from the vessel. And to prevent at least some hard alpha inclusions from entering the receptacle, the system includes a filter disposed between the vessel and the receptacle through which the molten reactive metal alloy passes before being received by the receptacle.

The filter includes a frame, and a porous surface that is disposed within the frame such that the frame extends peripherally about the porous surface. The porous surface defines a plurality of openings that are sized to permit the reactive metal alloy in molten form to pass therethrough. The filter is comprised of a material having a melting point that exceeds a melting point of the reactive metal alloy and is at least partially insoluble in the molten reactive metal alloy. The material of the filter can have a solubility less than a predetermined percent by weight in the molten reactive metal alloy, such as less than twenty-five percent by weight. Also, the material of the filter can have a melting point greater than a melting point of the reactive metal alloy by at least a predetermined amount, such as at least 500 degrees Celsius. For example, the filter can comprise an alloy including at least one of niobium, molybdenum, tantalum, rhenium and tungsten.

Further, to limit solidifying of the molten reactive metal alloy on the filter as the molten reactive metal alloy passes through the filter, the system can include a heating element in thermal contact with the filter. More specifically, the heating element can preheat the filter to thereby limit the solidifying of the molten reactive metal alloy within the openings defined by the porous surface of the filter. And in another embodiment, the system further includes a chamber defining an internal cavity within which the vessel, receptacle and filter are disposed. In this embodiment, the internal cavity is isolated from an external environment. Also, the heating element is capable of preheating the filter by passing current through the filter.

The system and filter of the present invention, therefore, filter hard alpha inclusions from reactive metal alloys with solvus temperatures displaying a positive slope. In contrast to conventional contamination control plans, the system and filter of the present invention add relatively little cost to the manufacture of components, and do not add any appreciable time to the production schedule of components. Further, in contrast to conventional contamination control plans, the system and filter of the present invention filter out hard alpha inclusions as opposed to attempting to control or limit the formation of such contaminants. And as such, no need exists to enforce or validate implementation of the filter.

BRIEF DESCRIPTION OF THE DRAWINGS

Figure 1:
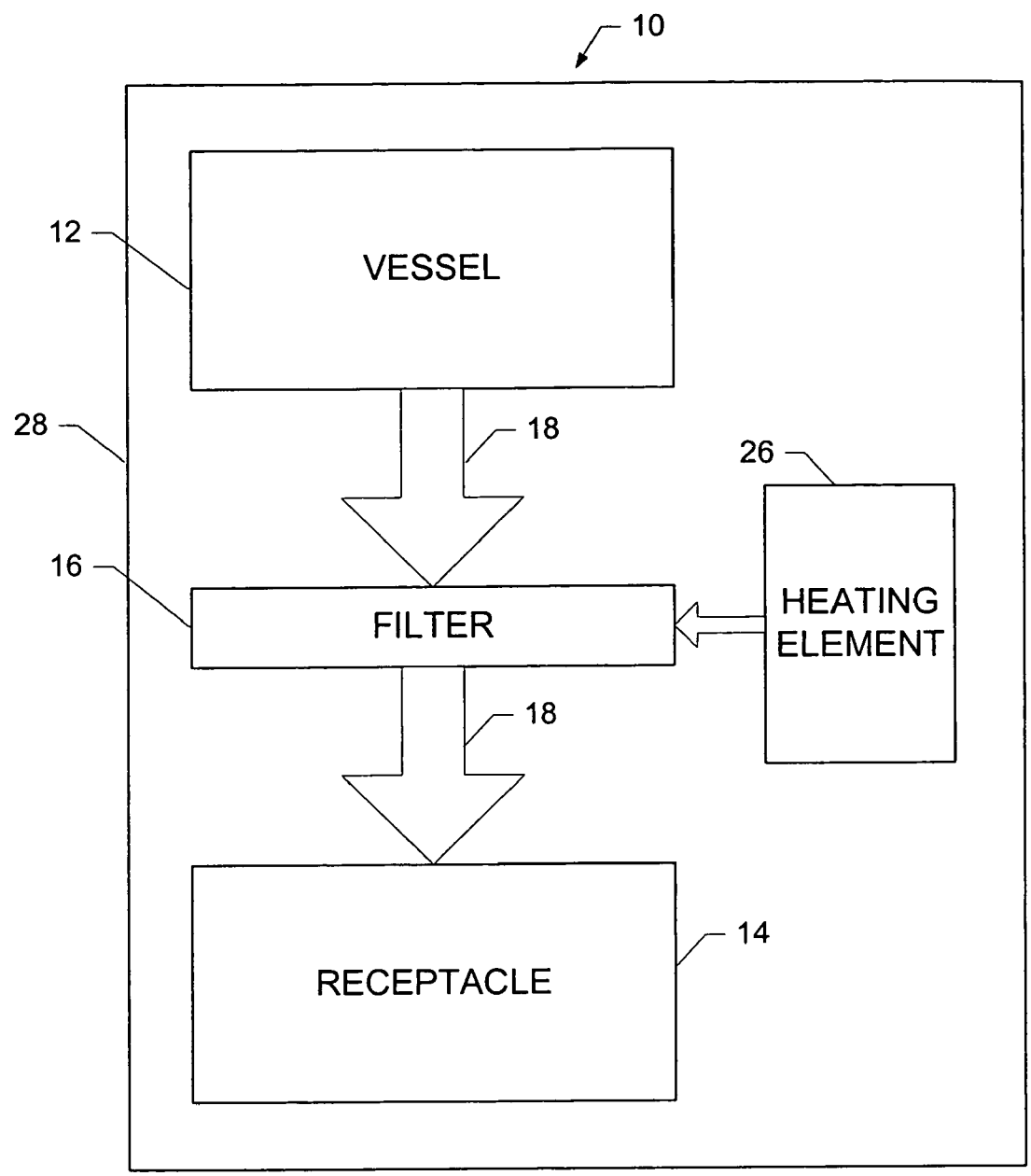
Figure 2:
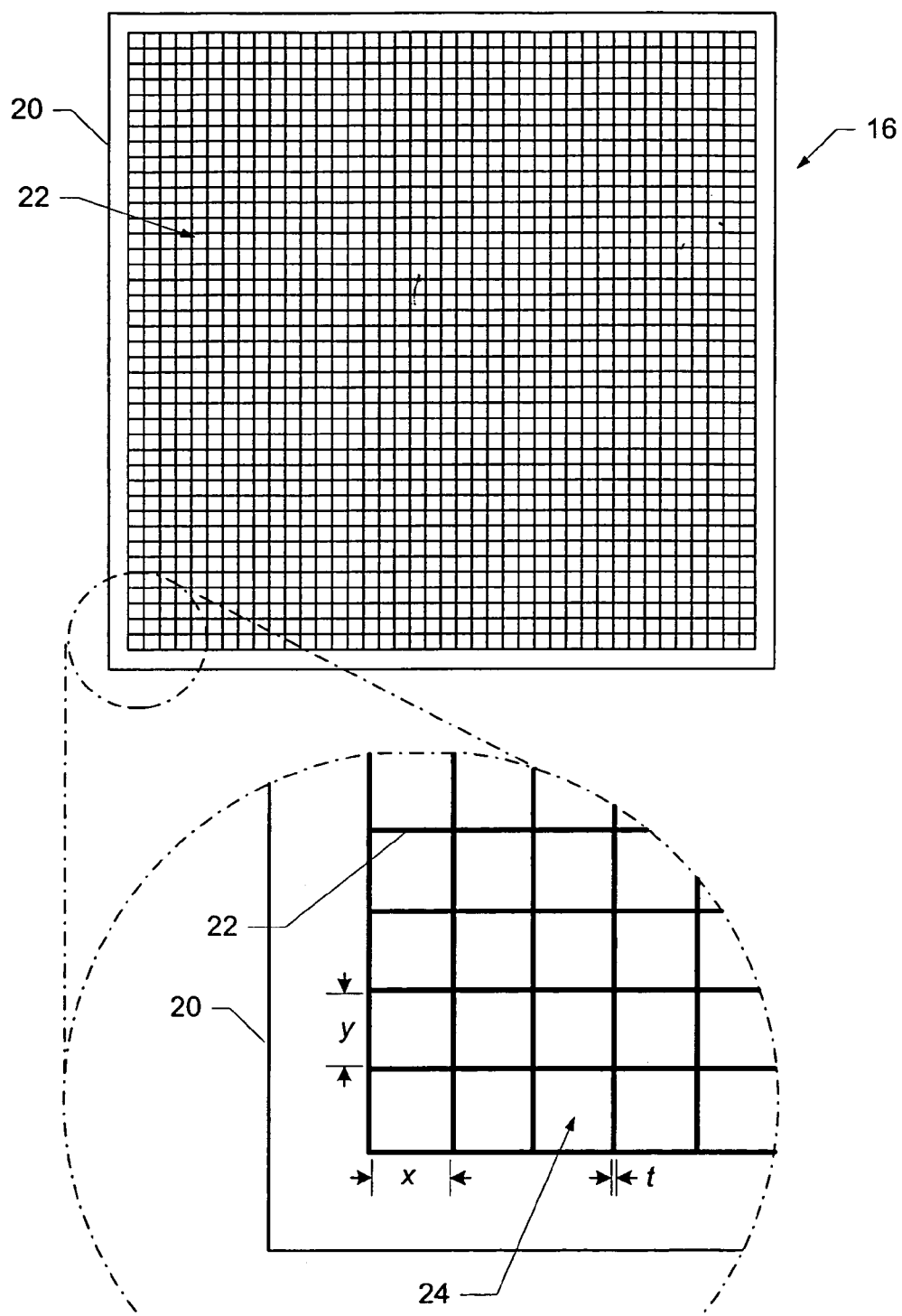
Figure 3:
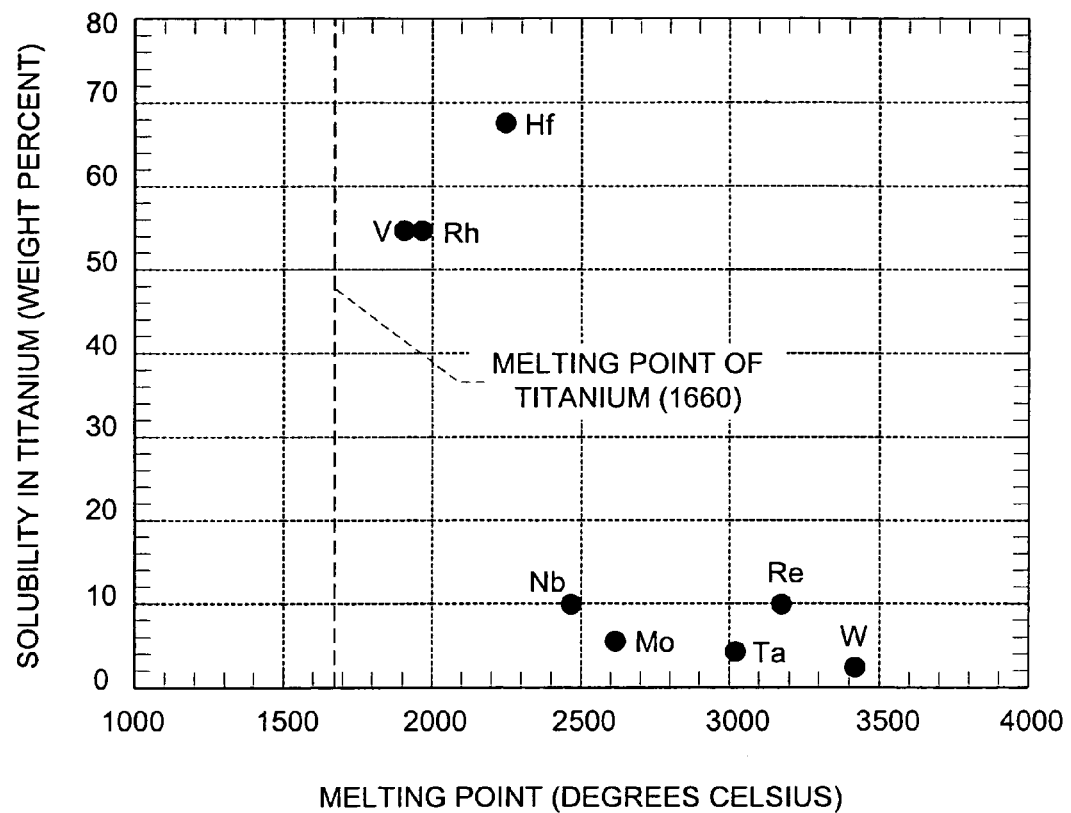
Figure 4:
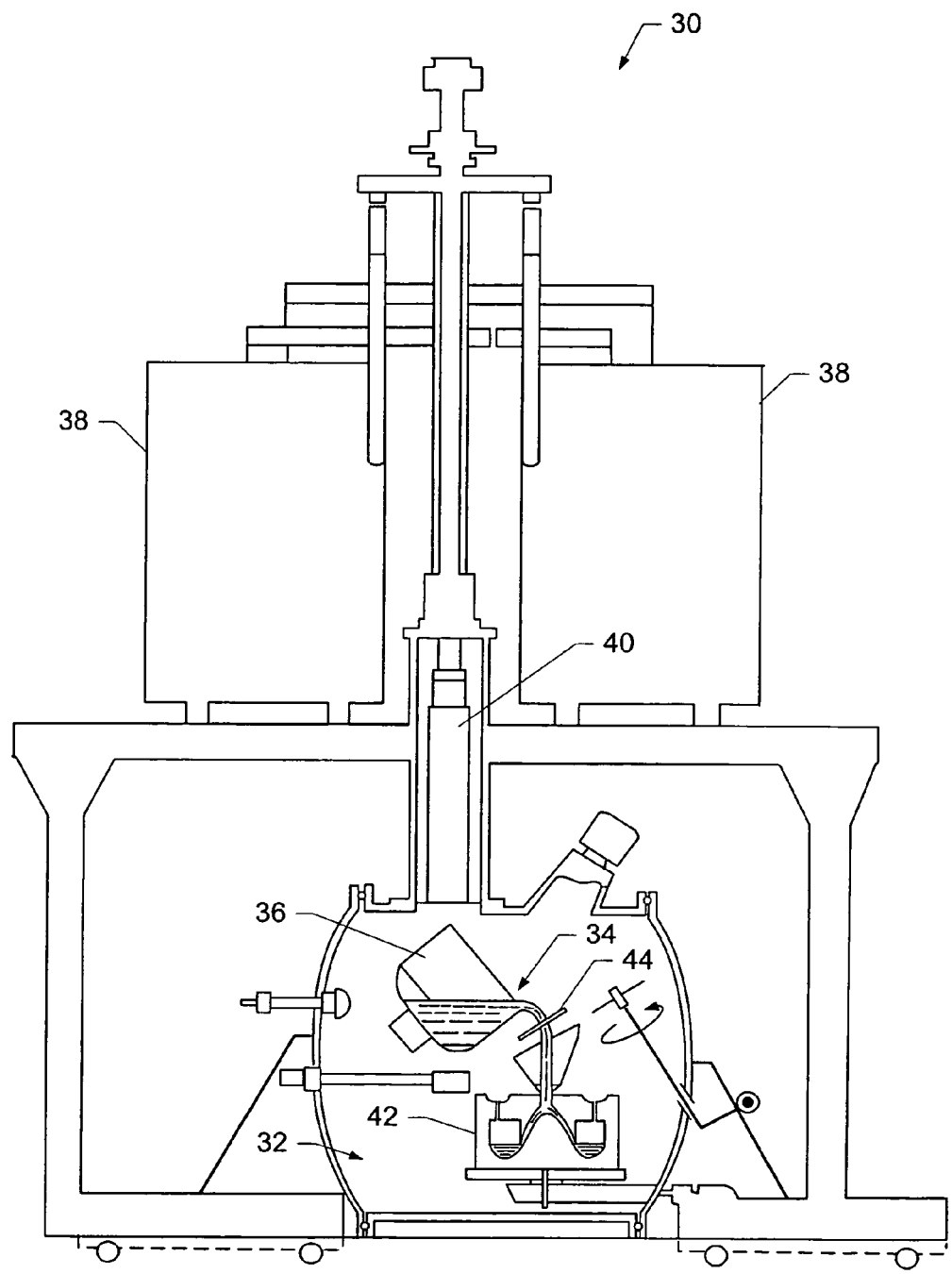

Having thus described the invention in general terms, reference will now be made to the accompanying drawings, which are not necessarily drawn to scale, and wherein:

FIG. 1 is a block diagram of a system for filtering hard alpha inclusions from a reactive metal alloy, according to one embodiment of the present invention;

FIG. 2 is a schematic front view of a filter according to one embodiment of the present invention with an exploded inset of a portion of the filter;

FIG. 3 is a graph illustrating the solubility per weight at the melting temperature of several refractory metals in accordance with one embodiment of the present invention; and FIG. 4 is a schematic view of a vacuum arc skull melting and casting furnace system including a filter in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for filtering hard alpha inclusions from reactive metal alloys includes a vessel 12, a receptacle 14 and a filter 16. The reactive metal alloys can comprise any of a number of alloys that are susceptible to hard alpha inclusions, such as titanium. In this regard, hard alpha inclusions originate within alloys during process operations that expose the molten reactive metal alloy to elements in air, particularly oxygen, nitrogen, and carbon. When such exposure occurs, the alloy takes the elements into solution where the elements simultaneously stabilize and embrittle the alpha phase of the alloy. In this regard, reactive metal alloys that are susceptible to hard alpha inclusions generally include those alloys with solvus temperatures that rise with interstitial oxygen, nitrogen or carbon content. These reactive metal alloys include those metal alloys that experience an increase in melting point as the oxygen, nitrogen or carbon content of the alloy increases, thus allowing local regions of high oxygen, nitrogen or carbon content to persist during melting of the alloy. For example, the reactive metal alloy can comprise any alloy including elements such as zirconium, hafnium, and yttrium. But in a preferred embodiment, the reactive metal alloy comprises titanium.

The vessel 12 is capable of holding the reactive metal alloy in molten form 18, and is capable of pouring the molten reactive metal alloy. The vessel can comprise any of a number of different materials so long as the vessel is capable of maintaining the vessel's mechanical strength and rigidity, and as long as the vessel does not react with or contaminate the molten reactive metal alloy. To allow the vessel to hold the molten reactive metal alloy without reacting with the metal alloy, the vessel can include an alloy "skull" layer of solidified reactive metal alloy on the inside surface of the vessel between the vessel and the molten reactive metal alloy, as such is known to those skilled in the art. For example, when the reactive metal alloy comprises titanium, the vessel can comprise a copper crucible with a titanium skull layer on the inside surface of the crucible between the molten titanium and the crucible.

The receptacle 14 is capable of receiving the molten reactive metal alloy poured from the vessel 12. The receptacle can comprise any of a number of different materials but, similar to the vessel, the receptacle is capable of maintaining the receptacle's mechanical strength and rigidity at high temperatures, and does not react with the molten reactive metal alloy 18. For example, the receptacle can comprise a ceramic mold for a component of a complex system, such as a fan for an aircraft engine. Also similar to the vessel, the receptacle can include a layer of material on the inner surface of the receptacle to allow the receptacle receive the molten reactive metal alloy without reacting therewith. For example, when the molten reactive metal alloy comprises titanium, the innermost layer of the receptacle (that faces the molten metal) can include a layer of rare earth metal oxide(s), such as erbia, that has a high melting point and chemical compatibility with the reactive molten titanium.

As previously stated, particular molten reactive metal alloys can develop hard alpha inclusions when the molten reactive metal alloy is exposed to elements in air, such as oxygen and nitrogen. As such, to filter hard alpha inclusions from the molten reactive metal alloy 18 poured from the vessel 12 into the receptacle 14, the system 10 includes the filter 16. The filter is disposed between the vessel and the receptacle and can be mounted in any manner therebetween. For example, the filter can be mounted directly over the opening of the vessel such that the molten reactive metal alloy passes through the filter as the vessel pours the molten reactive metal alloy into the receptacle. Alternatively, the filter can be mounted directly over the opening of the receptacle such that the molten reactive metal alloy poured from the vessel passes through the filter before the receptacle receives the molten reactive metal alloy.

As shown in FIG. 2, the filter 16 includes a frame 20, and a porous surface 22 disposed within the frame such that the frame extends peripherally about the porous surface. The porous surface defines a plurality of openings 24 that allow the molten reactive metal alloy 18 to pass through the porous surface. In one embodiment, the porous surface comprises a plurality of metal strands, such as wires, that extend across the frame in different directions and cross one another to thereby define the plurality of openings. As described below, the openings have a square shape, but it should be understood that the openings can be any shape without departing from the spirit and scope of the present invention.

The openings 24 of the filter 16 should be designed with a sufficient area such that the molten reactive metal alloy 18 can pass through the filter at a desired flow rate without accumulating on the porous surface 22 of the filter. But the area of the openings should also be small enough that the porous surface maintains the filter's mechanical strength and rigidity as the molten reactive metal alloy passes therethrough. Additionally, the area of the openings should be small enough so that solid contaminants, particularly hard alpha inclusions, do not pass through the filter. In this regard, the area of the openings can be selected to thereby select the maximum size of the hard alpha inclusions allowed through the filter. For example, the openings can be selected to have dimensions x and y, that equal one another and are equal to 0.070 inches. Also, the thickness, t, of the porous surface between the openings (or diameter of the wires if the porous surface comprises such) can be selected to equal 0.0050 inches. Thus, the porous surface would define a plurality of openings that are 87% open (i.e., $0.070^2/[0.070+0.0050]^2$). As another example, the porous surface can define openings that are selected to be 90% open, with the thickness, t, selected to be between 0.005 and 0.010 inches, and the x and y dimensions determined accordingly.

Again referring to FIG. 1, to limit the solidification of the molten reactive metal alloy on the porous surface 22 of the filter 16 and, particularly, within the openings 24, the system 10 can further include a heating element 26. The heating element is capable of preheating the filter prior to and/or during pouring of the molten reactive metal alloy from the vessel 12. The heating element can comprise any of a number of different devices as such are known. The heating element is capable of preheating the filter to a temperature sufficient to limit the amount of molten reactive metal alloy that solidifies on the filter to as little as possible. In one embodiment, the system further includes a chamber 28, such as a vacuum chamber, that defines an internal cavity within which the vessel, receptacle 14 and filter are disposed. In this embodiment, the heating element can preheat the filter by passing current through the filter sufficient to preheat the filter to a desired temperature.

Referring now to FIG. 3, the porous surface 22 of the filter 16 can comprise any of a number of different refractory metals or refractory metal alloys. Similarly, the frame 20 can comprise any of a number of different refractory metals or refractory metal alloys. In a preferred embodiment, the frame comprises the same material as the porous surface, although the frame and porous surface can comprise different materials without departing from the spirit and scope of the present invention. The refractory metal or refractory metal alloy is selected such that the refractory metal or refractory metal alloy has a melting point that exceeds a melting point of the reactive metal alloy and is at least partially insoluble in the molten reactive metal alloy 18. In this regard, the refractory metal or refractory metal alloy may be selected to have a solubility less than a predetermined percent by weight in the molten reactive metal alloy, and a melting point greater than the melting point of the reactive metal alloy by at least a predetermined amount. By so selecting the refractory metal or refractory metal alloy, the material of the filter has the least chance of contaminating the molten reactive metal alloy as the molten reactive metal alloy passes therethrough, and the material is the least susceptible to creep or deflection.

Therefore, with respect to titanium, the materials located in the lower right region of the graph of FIG. 3 include those refractory metals that have a sufficiently low solubility in molten titanium at a sufficiently high melting temperature from which the porous surface 22 and/or the frame 20 of the filter 16 can be made. As is known, titanium has a melting point of approximately 1660 degrees Celsius (designated in FIG. 3 by the broken line). As an example, the material can be selected to have a melting point at least 500 degrees Celsius more than the melting point of titanium. Also, the material may be selected to have a solubility less than twenty-five percent by weight at the melting point of the material. It should also be understood, however, that the material of the porous surface and/or the frame can be selected with other differences in melting temperature and other amounts of insolubility if so desired. As shown, for example, in the preferred embodiment where the molten reactive metal alloy 18 comprises molten titanium, the porous surface comprises tungsten, W. It should be understood, however, that the porous surface and/or the frame can also comprise niobium, Nb, tantalum, Ta, molybdenum, Mo, and/or rhenium, Re. Alternatively, the porous surface and/or the frame can comprise a refractory metal alloy that includes at least one refractory metal selected from W, Nb, Ta, Mo and Re, as well as vanadium, V, rhodium, Rh and hafnium Hf.

Referring to FIG. 4, one type of system that would benefit from the filtering of the present invention is depicted. As shown, a vacuum arc skull melting and casting furnace 30 generally includes a vacuum-tight chamber 32 in which molten metal alloy 34 is driven down into a crucible 36 (i.e., vessel). A power supply 38 provides current to strike an electric arc between a consumable electrode 40 and the crucible to thereby melt the reactive metal alloy in the crucible. The crucible can be water cooled and, as such, a solidified metal alloy skull can form on the inner surface of the crucible thereby shielding the crucible from direct contact with the molten metal alloy. Once a specified amount of molten metal alloy 34 is contained within the crucible 36, the electrode 40 can be retracted. Thereafter, the crucible is tilted to pour the molten metal alloy into an investment casting mold 42 (i.e., receptacle) positioned beneath the crucible. Before the molten metal alloy reaches the investment casting mold, however, the molten metal alloy can pass through a filter 44 designed in accordance with the present invention. The filter is disposed between the crucible and the investment casting mold. And by passing the molten metal alloy through the filter, solid contaminants, particularly hard alpha inclusions, can be removed from the molten metal alloy.

It will be appreciated that the system and filter of the present invention can be utilized in many different applications, of which the vacuum arc skull melting and casting furnace used in investment casting is one example. The system and filter of the present invention would benefit any system or process where molten reactive metal alloy that is susceptible to hard alpha inclusions or other contaminants. For example, the system and filter of the present invention can be used to purify molten reactive metal alloy by removing hard alpha inclusions and other contaminants from molten reactive metal alloy supply stock for forging, extrusions or the like.

Therefore, the present invention provides a system and filter that adds relatively little cost to the manufacture of components, when compared to the cost to develop and implement a conventional detailed contamination control plan. Also, no need exists to enforce or validate implementation of the system and filter of the present invention, in contrast to conventional contamination control plans. In this regard, the design of components made from relevant alloys manufactured according to the present invention need not account for the presence of hard alpha inclusions larger than the size of the openings of the filter. Systems utilizing such improved components will benefit from improved reliability and safety, and reduced cost, due to extended safe operating life and reduced inspection.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for filtering hard alpha inclusions from a reactive metal alloy comprising at least one of the group consisting of a titanium alloy and a zirconium alloy, said system comprising:
   a vessel capable of holding the reactive metal alloy in a molten form, wherein said vessel is capable of pouring the molten reactive metal alloy, wherein the reactive metal alloy comprises at least one of the group consisting of a titanium alloy and a zirconium alloy;
   a receptacle for receiving the molten reactive metal alloy poured from said vessel; and
   a filter disposed between said vessel and said receptacle through which the molten reactive metal alloy passes before being received by said receptacle for preventing at least some hard alpha inclusions from entering said receptacle, said filter comprising a plurality of metal strands to define a plurality of openings of substantially equal size, and said filter comprised of a material having a melting point that exceeds a melting point of the reactive metal alloy and is at least partially insoluble in the molten reactive metal alloy.

2. A system according to claim 1 further comprising:
   a heating element in thermal contact with said filter, wherein said heating element is capable of preheating said filter so as to limit solidifying of the molten reactive metal alloy on said filter as the molten reactive metal alloy passes therethrough.

3. A system according to claim 2 further comprising:
   a chamber defining an internal cavity within which said vessel, receptacle and filter are disposed, wherein the internal cavity is isolated from an external environment, and wherein said heating element is capable of preheating said filter by passing current through said filter.

4. A system according to claim 2, wherein said filter comprises a porous surface defining a plurality of openings, and wherein said heating element preheats said filter to thereby limit the solidifying of the molten reactive metal alloy within the openings defined by said porous surface of said filter.

5. A system according to claim 1, wherein said filter comprises a refractory metal.

6. A system according to claim 5, wherein the refractory metal is selected from a group consisting of niobium, molybdenum, tantalum, rhenium and tungsten.

7. A system according to claim 1, wherein said filter comprises:
   a frame; and
   a porous surface disposed within said frame such that said frame extends peripherally about said porous surface, wherein said porous surface defines the plurality of openings that are sized to permit the reactive metal alloy in molten form to pass therethrough.

8. A system according to claim 1, wherein said openings of said filter are at least 87% open.

9. A filter system for filtering hard alpha inclusions from a reactive metal alloy comprising at least one of the group consisting of a titanium alloy and a zirconium alloy, said filter system comprising:
   a frame;
   a porous surface disposed within said frame such that said frame extends peripherally about said porous surface, wherein said porous surface comprises a plurality of metal strands and defines a plurality of openings of substantially equal size that are sized to permit the reactive metal alloy in molten form to pass therethrough while separating at least some hard alpha inclusions therefrom, said porous surface comprised of a material having a melting point that exceeds a melting point of the reactive metal alloy and is at least partially insoluble in the molten reactive metal alloy; and
   a vessel capable of holding the reactive metal alloy in a molten form, wherein said vessel is capable of pouring the molten reactive metal alloy through said porous surface, wherein the reactive metal alloy comprises at least one of the group consisting of a titanium alloy and a zirconium alloy.

10. A filter system according to claim 9, further comprising a heating element that is capable of preheating the porous surface so as to limit solidifying of the molten reactive metal alloy on the porous surface as the molten reactive metal alloy passes through said porous surface.

11. A filter system according to claim 9, wherein said porous surface comprises a refractory metal.

12. A filter system according to claim 11, wherein the refractory metal is selected from a group consisting of niobium, molybdenum, tantalum, rhenium and tungsten.

13. A filter system according to claim 9, wherein said openings of said porous surface are at least 87% open.

14. A filter system for filtering hard alpha inclusions from a reactive metal alloy comprising at least one of the group consisting of a titanium alloy and a zirconium alloy, said filter system comprising:
   a frame; and
   a porous surface disposed within said frame such that said frame extends peripherally about said porous surface, wherein said porous surface comprises a plurality of metal strands and defines a plurality of openings of substantially equal size that are sized to permit the reactive metal alloy in molten form to pass therethrough while separating at least some hard alpha inclusions therefrom, said porous surface comprised of a refractory metal having a melting point that exceeds a melting point of the reactive metal alloy and is at least partially insoluble in the molten reactive metal alloy;

wherein said porous surface is formed of a thermally conductive material that is capable of being preheated so as to limit solidifying of the molten reactive metal alloy on the filter as the molten reactive metal alloy passes through said porous surface; and a receptacle for receiving the molten reactive metal alloy following its passage through said porous surface, wherein the reactive metal alloy comprises at least one of the group consisting of a titanium alloy and a zirconium alloy.

15. A method for filtering hard alpha inclusions from a molten form of a reactive metal alloy comprising at least one of the group consisting of a titanium alloy and a zirconium alloy, said method comprising:

provinding a filter comprising a plurality of metal strands to define a plurality of openings of substantially equal size, wherein providing the filter comprises providing a filter comprised of a material having a melting point that exceeds a melting point of the reactive metal alloy and is at least partially insoluble in the molten reactive metal alloy;

pouring the molten reactive metal alloy through the filter, wherein the reactive metal alloy comprises at least one of the group consisting of a titanium alloy and a zirconium alloy; and receiving the molten reactive metal alloy once the molten reactive metal alloy has passed through the filter, thereby permitting at least some hard alpha inclusions to be removed from the reactive metal alloy.

* * * * *